United States Patent

Amano et al.

Patent Number: 5,159,032
Date of Patent: Oct. 27, 1992

[54] PROCESS FOR TERMINATING THE POLYMERIZATION OF VINYL CHLORIDE WITH AN AQUEOUS DISPERSION OF AN ANTIOXIDANT CONTAINING A POLYOXYALKYLENE OXIDE

[75] Inventors: Tadashi Amano, Kawasaki; Shigehiro Hoshida, Kamisu, both of Japan

[73] Assignee: Shin-Etsu Chemical Co., Ltd., Tokyo, Japan

[21] Appl. No.: 562,926

[22] Filed: Aug. 6, 1990

[30] Foreign Application Priority Data

Aug. 7, 1989 [JP] Japan ............... 1-204123

[51] Int. Cl.$^5$ ............... C08F 2/38
[52] U.S. Cl. ............... 526/84; 526/83; 526/85; 526/344.2
[58] Field of Search ............... 526/82, 83, 84, 85, 526/209

[56] References Cited

U.S. PATENT DOCUMENTS 4,346,202  8/1982  Cohen ............... 526/84
4,590,301  5/1986  Lim ............... 568/633

*Primary Examiner*—Christopher Henderson
*Attorney, Agent, or Firm*—Oblon, Spivak, McClelland, Maier & Neustadt

[57] ABSTRACT

A process for preparing a vinyl chloride polymer, which comprises polymerizing vinyl chloride or a monomeric mixture composed mainly of vinyl chloride in an aqueous medium, wherein the polymerization reaction is terminated at the last stage of polymerization by addition of an aqueous dispersion of an antioxidant, containing a polyoxyalkylene glycol as a dispersing agent. A polymer with good initial coloration characteristic, thermal stability and take-up of plasticizer, and large bulk density can be obtained.

4 Claims, No Drawings

PROCESS FOR TERMINATING THE POLYMERIZATION OF VINYL CHLORIDE WITH AN AQUEOUS DISPERSION OF AN ANTIOXIDANT CONTAINING A POLYOXYALKYLENE OXIDE

BACKGROUND OF THE INVENTION

1. Field of the Invention

This invention relates to a process for preparing a vinyl chloride polymer, particularly to a process for preparing a vinyl polymer which is free from variance in take-up of plasticizer of the polymer obtained, and can obtain a homogeneous vinyl chloride polymer stably.

2. Description of the Prior Art

In the prior art, in preparation of a vinyl chloride polymer by polymerization of vinyl chloride or a monomeric mixture composed mainly of vinyl chloride in an aqueous medium, for obtaining a polymer of constant quality at all times, there has been proposed the method of terminating the polymerization by addition of an organic solvent solution of an antioxidant at a predetermined stage at the last stage of polymerization. However, in this method, the antioxidant cannot be uniformly dispersed in the polymerization system, and it has been difficult to terminate completely the polymerization over the entire region of the polymerization system. For this reason, even if the antioxidant may be added at the same timing, the quality of the polymer, for example, take-up of plasticizer differed from batch to batch to involve variance, whereby no homogeneous polymer could be prepared stably. Accordingly, for the purpose of dispersing the antioxidant uniformly into the polymerization system, there have been proposed the method of adding an aqueous dispersion of an antioxidant using an emulsifier into the polymerization system (Japanese Pre-examination Patent Publication (KOKAI) Nos. 149608/1985 and 186547/1985) and the method of adding an aqueous dispersion of an antioxidant using a water-soluble partially saponified polyvinyl alcohol into the polymerization system (Japanese Pre-examination Patent Publication (KOKAI) No. 218711/1983).

However, in the above-mentioned method using an emulsifier, initial coloration characteristic and thermal stability of the polymer obtained are worsened. In the method using a water-soluble partially saponified polyvinyl alcohol, there is involved the problem that the COD value of the wastewater from the polymerization vessel becomes high, etc.

SUMMARY OF THE INVENTION

Accordingly, an object of the present invention is to provide a process for preparing a vinyl chloride polymer which can produce a vinyl chloride polymer with good initial coloration characteristic, thermal stability and take-up of plasticizer, can control the COD value of the wastewater at a low level, free from variance in the quality of the polymer obtained with respect to take-up of absorbability from batch to batch in production, and can prepare a homogeneous polymer stably.

More specifically, the present invention provides a process for preparing a vinyl chloride polymer, which comprises the step of polymerizing vinyl chloride or a monomeric mixture mainly containing vinyl chloride in an aqueous medium, wherein the polymerization reaction is terminated at the last stage of polymerization by addition of an aqueous dispersion of an antioxidant, containing a polyoxyalkylene glycol as a dispersing agent.

The process of the present invention provides a polymer which is good in all of initial coloration characteristic, thermal stability and take-up of plasticizer, free from variance in take-up of plasticizer of the polymer obtained from batch to batch in production, and can prepare a homogeneous polymer stably. For this reason, quality control of the product polymer in factory can be done stably, which is of very high practical value in industry. Also, according to the process of the present invention, a polymer of high bulk specific density can be obtained.

DETAILED DESCRIPTION OF PREFERRED EMBODIMENTS

Antioxidant

The antioxidant to be used in the present invention is not particularly limited, but may be one generally employed in production of vinyl chloride polymers. For example, there may be included phenol compounds such as 2,2-di(4'-hydroxy-phenyl)propane, hydroquinone, p-methoxyphenol, t-butylhydroxyanisole, n-octadecyl-3-(4-hydroxy-3,5-di-t-butylphenyl)propionate, 2,5-di-t-butylhydroquinone, 4,4'-butylidenebis(3-methyl-6-t-buthylphenol), 3,5-di-t-butyl-4-hydroxytoluene, 2,2,-methylene-bis(4-ethyl-6-t-butylphenol), triethylene glycol-bis[3-(3-t-butyl-5-methyl-4-hydroxyphenyl)propionate], pentaerythrityl-tetrakis[3-(3,5-di-t-butyl-4-hydroxyphenyl)propionate], 2,6-di-t-butyl-4-methylphenol, t-butylcatechol, 4,4'-thiobis(6-t-butyl-m-cresol), tocopherol, nordihydroguaiaretinic acid, etc.; semicarbazide, and derivatives of semicarbazide such as hydrofluoride, hydrochloride, nitrate, acidic sulfate, sulfate, chlorate, formate, acidic oxalate, acidic maleate or maleate, 1-acetylsemicarbazide, 1-chloroacetylsemicarbazide, 1-dichloroacetylsemicarbazide, 1-benzoylsemicarbazide, semicarbazone, etc.; carbohydrazide, thiosemicarbazide, thiosemicarbazide derivatives such as thiosemicarbazone, etc.; thiocarbazide and thiocarbazide derivatives; amine compounds such as phenylnaphtylamine, N,N,-diphenyl-p-phenylenediamene, 4,4-bis(dimethylbenzyl)-diphenylamine, etc.; nitro or nitroso compounds such as nitoanisole, N-nitrosodiphenylamine, nitroaniline, N-nitrosophenyl-hydroxylamine aluminum salt, etc.; phosophorus compounds such as triphenylphosphite, diphenylisodecylphosphite, phenyldiisodecylphosphite, 4,4'-butylidene-bis(3-methyl-6-t-butylphenyl-di-tridecyl)phosphite, cyclic pentanetetraylbis(octadecylphosphite), tris(nonylphenyl)phosphite, tris(dinonylphenyl)phosphite, etc.; unsaturated hydrocarbon compounds such as styrene, 1,3-hexadiene, methylstyrene, etc.; sulfur compounds such as dilaurylthiodipropionate, dimirystylthiodipropionate, distearylthiodipropionate, dodecylmercaptan, 1,3-diphenyl-2-thiourea, etc.; and so on. These may be used either singly or in combination of two or more. Among these, in view of good initial coloration characteristic of the polymer obtained and little deposition of scale on the wall of a polymerization vessel, t-bytylhydroxyanisole, di-t-butylhydroquinone, 2,6-di-t-butyl-4-methylphenol are preferred.

Polyoxyalkylene glycol

As the polyoxyalkylene glycol to be used as the dispersing agent in the present invention, for example, there may be included homopolymers of $C_2$ to $C_4$ alkylene oxides such as ethylene oxide, propylene oxide, butylene oxide, etc. or copolymers of at least two alkylene oxides selected from these. The copolymer may be a random copolymer, or a block copolymer.

Aqueous dispersion

The aqueous dispersion of the antioxidant containing the polyoxyalkylene glycol as the dispersing agent to be used in the present invention can be prepared by adding an antioxidant as its neat condition or as a solution in an appropriate solvent to an aqueous solution or an aqueous dispersion of a polyoxyalkylene glycol. The solvent for dissolving the antioxidant includes, for example, methanol, ethanol, isopropyl alcohol, acetone, etc. The concentration of the polyoxyalkylene glycol in the aqueous solution or the aqueous dispersion of the polyoxyalkylene glycol to which the antioxidant is added should be preferably in the range from 0.01 to 50% by weight from the viewpoint of making the dispersed state of the antioxidant in the aqueous dispersion good, and maintaining the viscosity of the aqueous dispersion in an adequate range.

The concentration of the antioxidant in the resulting aqueous dispersion is generally in the range from 10 to 80% by weight, and may be suitably selected according to the concentration of the polyoxyalkylene glycol in the above-described aqueous dispersion. As the concentration of the antioxidant is higher, more amount of a polyoxyalkylene glycol is required for stabilizing the dispersed state of the antioxidant.

Practice of the process

In the process of the present invention, the polymerization reaction is terminated by adding the aqueous dispersion prepared as described above into the polymerization system at the last stage of polymerization. Generally, the pressure within the polymerization vessel begins to fall with the progress of the polymerization. Preferably, when the pressure becomes from 3.0 kg/cm$^2$·G to 8.0 kg/cm$^2$·G, the aqueous dispersion is added into the polymerization system for terminating the polymerization. The pressure inside the polymerization vessel when the addition of the aqueous dispersion is to be performed should be preferably selected from the range of 3.0-8.0 kg/cm$^2$·G to according to the polymerization temperature, because the pressure also depends on the polymerization temperature.

The aqueous dispersion is preferably added to the polymerization system in an amount such that the antioxidant may be 0.0001 to 0.5 part by weight, particularly 0.005 to 0.05 part by weight, per 100 parts by weight of vinyl chloride or the monomeric mixture composed mainly of vinyl chloride, because the polymerization reaction can be terminated effectively and a polymer with good initial coloration characteristic can be obtained. If the dispersion stability of the antioxidant in the aqueous dispersion is low, it may be added under stirring or homogenized before addition into the polymerization system.

Monomers

The monomeric starting material to be used in the process of the present invention is vinyl chloride or a monomeric mixture composed mainly of vinyl chloride. The monomeric mixture composed mainly of vinyl chloride is normally a mixture comprising 50% by weight or more of vinyl chloride and other monomers copolymerizable with vinyl chloride. Examples of monomers copolymerizable with vinyl chloride which can be employed may include vinyl esters such as vinyl acetate, vinyl propionate, etc.; acrylates such as methyl acrylate, ethyl acrylate, or corresponding methacrylates; olefins such as ethylene, propylene, etc.; maleic anhydride; acrylonitrile; styrene; and vinylidene chloride. These may be employed either singly or in combination of two or more.

Other conditions

In the process of the present invention, a dispersing aid which may be used when carrying out polymerization of vinyl chloride or a monomeric mixture containing vinyl chloride is not particularly limited, but one used for preparation of vinyl chloride polymers in the prior art may be employed. Examples of such dispersing aids may include water-soluble cellulose ethers such as methyl cellulose, hydroxyethyl cellulose, hyroxypropyl cellulose, hydroxypropylmethyl cellulose, and the like; water-soluble partially saponified polyvinyl alcohols; acrylic acid polymers; water-soluble polymers suc as gelatin; oil-soluble emulsifiers such as sorbitane monolaurate, sorbitane trioleate, glycerine tristearate, ethylene oxide-propylene oxide block copolymer; water-soluble emulsifiers such as polyoxy-ethylene sorbitane monolaurate, polyoxyethylene glycerine oleate, sodium laurate, etc. These may be employed either singly or in combination of two or more.

In the process of the present invention, the polymerization initiator employed is not particularly limited, and any of those conventionally used for preparation of vinyl chloride polymers in the prior art may be available. For example, there may be employed percarbonate compounds such as diisopropyl peroxodicarbonate, di-2-ethylhexyl peroxodicarbonate, diethoxyethyl peroxodicarbonate, etc.; perester compounds such as t-butyl peroxypivalate, t-hexyl peroxypivalate, t-butyl peroxyneodecanate, α-cumyl peroxyneodecanate, etc.; peroxides such as acetylcyclohexylsulfonyl peroxide, 2,4,4-trimethylpentyl-2-peroxyphenoxyacetate, 3,5,5-trimethylhexanoyl peroxide, etc.; azo compounds such as azobis-2,4-dimethylvaleronitrile, azobis-(4-methoxy-2,4-dimethylvaleronitrile), etc.; potassium persulfate, ammonium persulfate, hydrogen peroxide, etc. These can be used either singly or in combination of two or more.

Other conditions in polymerization, for example, the methods of charging, the amounts of the aqueous medium, vinyl chloride or the monomeric mixture containing vinyl chloride, the dispersing agent and the polymerization initiator to be charged into the polymerizer, or the polymerization temperature, etc. may be also similar to those in the prior art.

In the process of the present invention, if necessary, polymerization degree controllers, chain transfer agents, pH controllers, gellation improvers, antistatic agent, etc. can be also used suitably. Also, antioxidants can be added into the polymerization system for the purpose of inhibiting polymerization reaction, preventing deterioration of the polymer formed, etc., before, during or after polymerization.

EXAMPLES

The present invention in described in detail by referring to Examples and Comparative examples.

EXAMPLES 1-4, COMPARATIVE EXAMPLES 1-3

In each example, into a polymerizer made of stainless steel of 130-liter inner volume were charged 60 kg of deionized water, 30 g of a water-soluble partially saponified polyvinyl alcohol and 15 g of di-2-ethylhexyl peroxodicarbonate. After degassing until the pressure within the polymerization vessel became 80 mmHg, 30 kg of vinyl chloride was charged, and the temperature was elevated to 57° C. by passing hot water through the jacket, and the polymerization was thereby carried out under stirring. Then, when the pressure within the polymerizer fell to 7.5 kg/cm$^2$·G, the polymerization was terminated by addition of the aqueous dispersions or solutions of A-F shown below, respectively, and the unreacted monomer was recovered. Comparative example 1 is an example, in which none of the aqueous dispersions or solutions of A-F shown below is added. Those marked with the asterisk* are aqueous dispersions fitted to the conditions of the present invention.

A*: aqueous dispersion comprising 2,6-di-butyl-4-methyl-phenol dispersed at a concentration of 30% by weight in an aqueous 20% by weight solution of a random copolymer of ethylene oxide and propylene oxide;

B*: aqueous dispersion comprising 2,2-di(4'-hydroxyphenyl)propane at a concentration of 30% by weight in an aqueous 20% by weight solution of a random copolymer of ethylene oxide and propylene oxide;

C*: aqueous dispersion comprising 2,2-di(4'-hydroxyphenyl)propane at a concentration of 25% by weight prepared by adding 50% by weight methanolic solution of 2,2-di(4'-hydroxyphenyl)propane to 30% by weight aqueous solution of a block copolymer of ethylene oxide and propylene oxide;

D*: aqueous dispersion comprising t-butylhydroxyanisole at a concentration of 25% by weight prepared by adding 50% by weight methanolic solution of t-butylhydroxyanisole into 20% by weight aqueous solution of a block copolymer of ethylene oxide and propylene oxide;

E: 50% by weight methanolic solution of 2,2-di(4'-hydroxyphenyl)propane;

F: aqueous dispersion comprising 2,2-di(4'-hydroxyphenyl)propane dispersed at a concentration of 30% by weight prepared by dispersing it in 30% by weight aqueous solution of water-soluble partially saponified polyvinyl alcohol.

Then, the reaction mixture was taken out from the polymerization vessel, dehydrated and dried to obtain a polymer.

The polymer obtained was subjected to measurements of take-up of plasticizer, initial coloration characteristic and bulk specific density according to the methods as described below, and also the COD value of the wastewater discharged from the preparation process was measured according to JIS K 0102. The results are shown in Table 1.

Take-up of plasticizer

A polymer (400 g) was charged into a Brabender plastograph equipped with a stirrer controlled to a jacket temperature of 80° C., preheated under stirring for 4 minutes, then 200 g of DOP was added, and the time until dry-up was measures. Initial coloration characteristic Into 100 parts by weight of a polymer were formulated 1 part by weight of tin laurate, 0.5 part by weight of cadmium stabilizer and 50 parts by weight of dioctyl phthalate. After the mixture was kneaded by use of rolls at 160° C. for 5 minutes, a sample shaped in a sheet was prepared by press molding.

With the sample obtained from Example 1 as the standard, the coloration characteristic equal to that was evaluated as a, that slightly inferior thereto as b, and that markedly inferior thereto as c.

Thermal stability

The sample shaped in a sheet prepared for measurement of the above coloration characteristic was placed in a gear oven maintained at a temperature of 185° C., and the time before blackening of the sample was measured.

Bulk density

One kg of a polymer was placed in a planetary mixer, stirred for 10 minutes, and then bulk density was measured according to JIS K 6721.

TABLE 1

| | Example | | | | Comparative example | | |
|---|---|---|---|---|---|---|---|
| | 1 | 2 | 3 | 4 | 1 | 2 | 3 |
| Antioxidant | A* | B* | C* | D* | — | E | F |
| Amount of antioxidant*[1] (wt. parts) | 0.05 | 0.05 | 0.02 | 0.02 | — | 0.03 | 0.05 |
| Take-up of plasticizer (min.) | 24.2 | 24.0 | 24.3 | 24.1 | 28.2 | 25.3 | 26.5 |
| Initial coloration characteristic | a | a | a | a | b | c | b |
| Thermal stability (min.) | 90 | 85 | 90 | 90 | 90 | 70 | 85 |
| Bulk density (g/cm$^3$) | 0.530 | 0.529 | 0.529 | 0.527 | 0.503 | 0.501 | 0.503 |
| COD of wastewater | 20 | 21 | 24 | 25 | 19 | 24 | 29 |

(Note)
*[1] Amount of aqueous dispersion of antioxidant charged (however, solution in Comparative example 2) per 100 parts by weight of the monomer charged.

We claim:

1. A process for preparing a vinyl chloride polymer, which comprises the step of polymerizing vinyl chloride or a monomeric mixture containing mainly vinyl chloride in an aqueous medium, wherein the polymerization reaction is terminated at the last stage of polymerization by addition of an aqueous dispersion comprising 10 to 80% by weight of an antioxidant, and 0.01 to 50% by weight of a random or block copolymer of ethylene oxide and propylene oxide as a dispersing agent.

2. A process according to claim 1, wherein said antioxidant is selected from the group consisting of t-butylhydroxyanisole, di-t-butylhydroquinone and 2,6-di-t-butyl-4-methylphenol.

3. A process according to claim 1, wherein said aqueous dispersion is added to the polymerization system when the pressure within the polymerization vessel has fallen to 3.0 to 8.0 kg/cm$^2 \cdot$G.

4. A process according to claim 1, wherein said aqueous dispersion is added in an amount such that the antioxidant agent may be from 0.001 to 0.5 part by weight per 100 parts by weight of the charged monomer.

* * * * *